(12) United States Patent
Cao et al.

(10) Patent No.: US 7,849,097 B2
(45) Date of Patent: Dec. 7, 2010

(54) MINING LATENT ASSOCIATIONS OF OBJECTS USING A TYPED MIXTURE MODEL

(75) Inventors: Yunbo Cao, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 11/786,636

(22) Filed: Apr. 12, 2007

(65) Prior Publication Data

US 2008/0147654 A1    Jun. 19, 2008

Related U.S. Application Data

(60) Provisional application No. 60/875,278, filed on Dec. 15, 2006.

(51) Int. Cl.
*G06F 7/00* (2006.01)

(52) U.S. Cl. .................. 707/776; 707/737; 709/212; 709/217

(58) Field of Classification Search ............... 707/116, 707/736; 709/212, 217
See application file for complete search history.

(56) References Cited

U.S. PATENT DOCUMENTS

| 6,839,680 | B1 * | 1/2005 | Liu et al. .................... 705/10 |
| 7,756,871 | B2 * | 7/2010 | Yacoub et al. ............. 707/736 |
| 2006/0095264 | A1 * | 5/2006 | Wu et al. ................... 704/260 |

* cited by examiner

*Primary Examiner*—Wilson Lee
*Assistant Examiner*—Tuan-Khanh Phan
(74) *Attorney, Agent, or Firm*—Joseph R. Kelly; Westman, Champlin & Kelly, P.A.

(57) ABSTRACT

A typed separable mixture model is used to mine associative relationships between sets of objects. Instead of modeling only one type of co-occurrence among the sets of objects, the typed separable mixture model can model multiple different types of co-occurrences among more than two sets of objects, and co-occurrences that exist in different contexts.

16 Claims, 7 Drawing Sheets

MINING LATENT ASSOCIATIONS OF OBJECTS USING A TYPED MIXTURE MODEL

The present application is based on and claims the benefit of U.S. provisional patent application Ser. No. 60/875,278, filed Dec. 15, 2006, the content of which is hereby incorporated by reference in its entirety.

BACKGROUND

Computerized processing of data, and specifically textual data, can be useful in a wide variety of different applications. One important technique in processing data is to find relationships between different sets of textual objects. In other words, the sets of textual objects are sets of words that may, for example, be sets of topics and sets of names. Processing text documents to find co-occurrences of the objects in the sets identifies relationships between the objects. For instance, if a person's name frequently co-occurs with a topic in documents, it may be concluded that the person is an expert on that topic.

In finding these types of relationships, co-occurrence data between terms extracted from the texts is very useful. The general mining task of identifying associative relationships between objects based on co-occurrence data is referred to as object association mining. Specifically, object association mining is an estimation of a joint probability between objects using the co-occurrence data. The specific task of identifying an expert, or a person's area of expertise, is referred to as expert/expertise mining and is but one example of object association mining, although the present discussion is not limited to that example.

Another mining technique that can be of help in identifying relations between objects is referred to as mining latent associations between two sets of objects. By latent associations it is meant that the associative relations are represented in clusters of objects. Similar objects in the two sets are grouped into the same cluster. When such latent associations are identified, the associative relationships between the objects can be better understood.

One current approach to identifying latent associations is to use a separable mixture model (SMM) to mine the latent object associations. By using an SMM, the joint probability distribution between objects is defined as a finite mixture model. Each component of the mixture model corresponds to a soft cluster of objects. A SMM works well in situations where the co-occurrence data reflects only one kind of co-occurrence among the two sets of objects. That is, the SMM works well if the data contains only one kind of co-occurrence relationship between objects in a first set of objects X and objects in a second set of objects Y.

More specifically, and again using the example of expert/expertise mining. Assume a first set of objects is a list of topics and a second set of objects is a list of people. Co-occurrences between the objects in those two sets will be identified from a set of textual inputs, such as a set of documents. For instance, if a topic appears in the title of a document, while an author appears in the author section of the document, then a co-occurrence between those two objects is obtained. If other types of co-occurrences are present (such as the topic and person's name appearing in the body of the document) they are not considered by an SMM.

The discussion above is merely provided for general background information and is not intended to be used as an aid in determining the scope of the claimed subject matter.

SUMMARY

It can be seen that it may very well be useful to consider co-occurrences of different types. For instance, it may be useful to also consider whether a person's name and the topic occur within the body of a document. Similarly, it may be helpful to consider whether two people's names both appear in the body of a document. In the prior SMM model, as discussed above, only a single type of co-occurrence (such as a person's name in the author section and a topic in the title co-occurring within the body of a document) can be considered. There has been no mechanism by which different types of co-occurrences can be combined into a single model that identifies latent associative relationships between the different sets of objects.

A typed separable mixture model is used to mine associative relationships between sets of objects. Instead of modeling only one type of co-occurrence among the sets of objects, the typed separable mixture model can model multiple different types of co-occurrences within a set of objects, among more than two sets of objects, and co-occurrences that exist in different contexts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
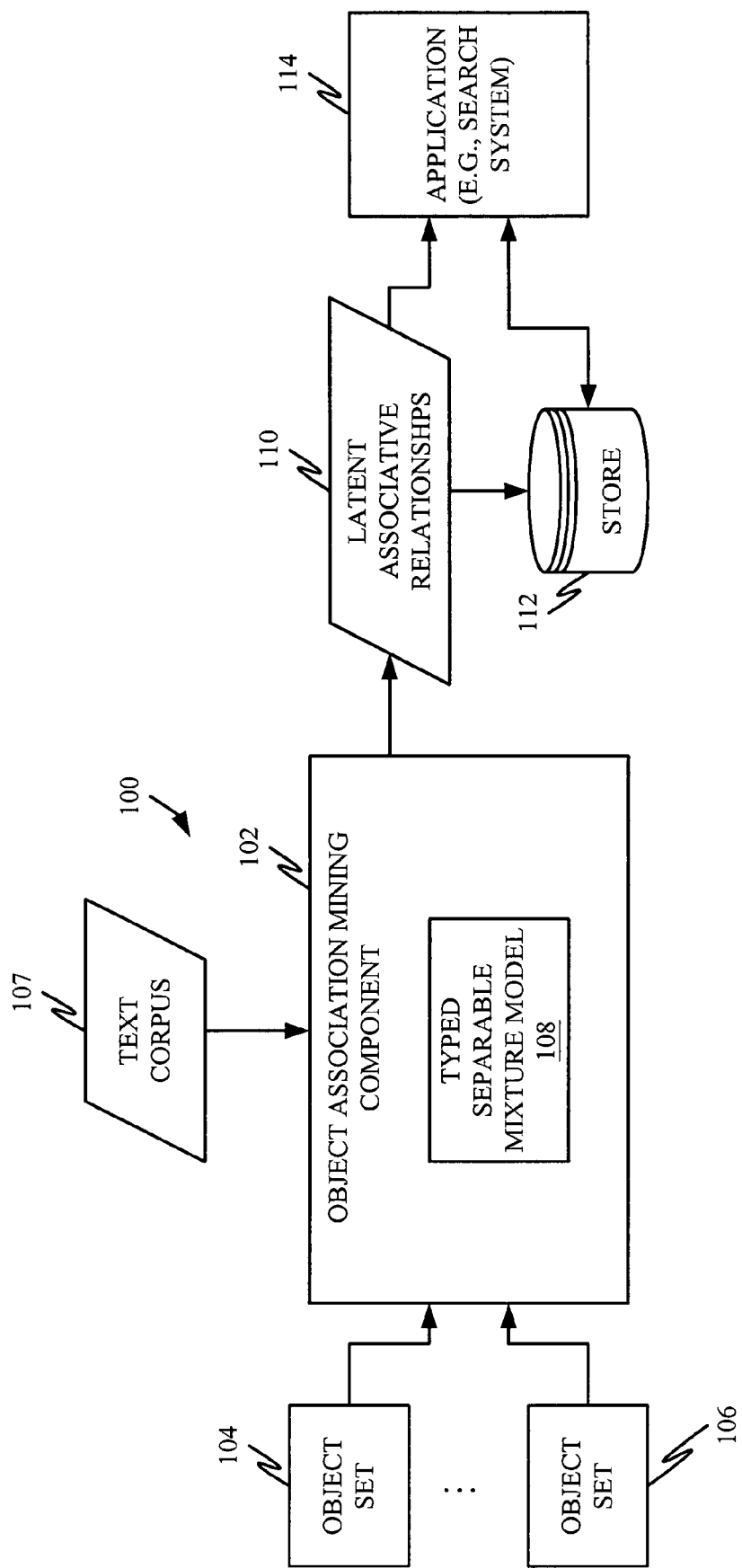
FIG. 1 is a block diagram of one embodiment of a latent associative relationship mining system.

FIG. 1 is a block diagram of a latent associative relationship mining system 100 in accordance with one embodiment. System 100 includes object association mining component 102 that receives, as an input, a set of objects 104 and 106 and that accesses text corpus 107. Of course, it will be appreciated that additional object sets and text corpora can be received (as will be described below) and object sets 104 and 106 and corpus 107 are provided for the sake of example only. Object association mining component 102 includes typed separable mixture model (TSMM) 108 that is used to identify latent associative relationships 110 between objects in the sets of objects 104 and 106. The latent associative relationships 110 can then be stored in a data store 112, or used in an application, such as a search system 114.

Figure 2:
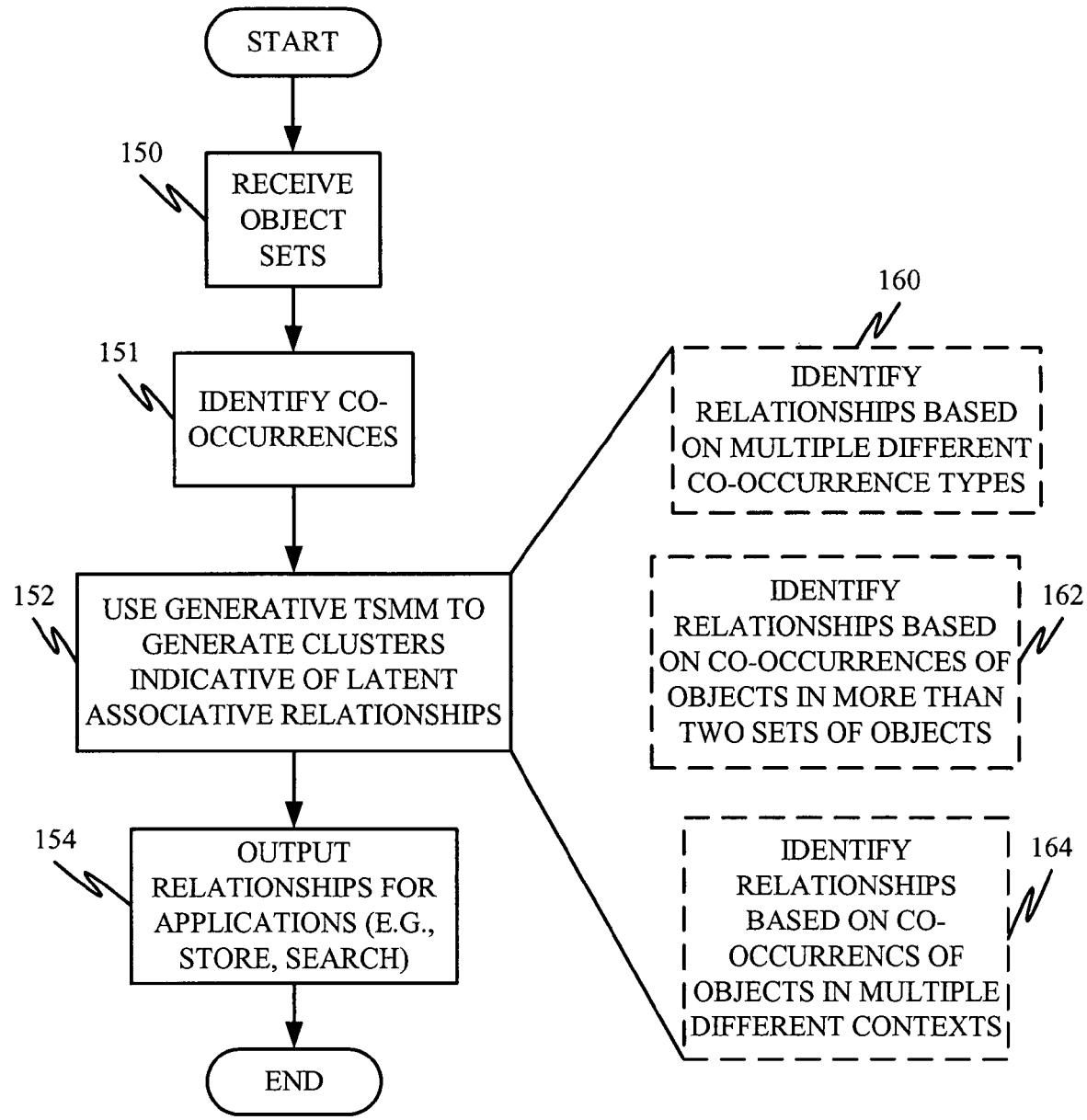
FIG. 2 is a flow diagram illustrating one embodiment of the operation of the system shown in FIG. 1.

FIG. 2 is a flow diagram illustrating one embodiment of the operation of system 100 shown in FIG. 1. FIGS. 1 and 2 will now be described in conjunction with one another.

In one embodiment, object association mining component 102 first receives, as inputs, the sets of objects 104 and 106. The sets of objects 104 and 106, for the sake of the exemplary description set out herein, will include natural language terms (such as words). For instance, object set 104 may be a set of noun phrases, that identify topics. Object set 106 may be a set of names that identify potential experts. Receiving the object sets is indicated by block 150 in FIG. 2.

Object association mining component 102 then receives text corpus 107 and identifies co-occurrences of the objects in sets 104 and 106 in the text corpus. Text corpus 107 may, for example, be a set of documents and a co-occurrence is present if words in object sets 104 and 106 co-occur in one of the documents. Identifying co-occurrences is indicated by block 151 in FIG. 2.

Component 102 then uses typed separable mixture model 108 to generate clusters indicative of latent associative relationships 110. This is indicated by block 152 in FIG. 2, and is described in greater detail below with respect to FIGS. 4-6.

Once the latent associative relationships 110 are generated (or identified by the clusters) they can be output to a data store 112, or to an application or other runtime system 114. Application 114 can be any of a wide variety of different types of systems, such as an expert search system which receives as an input an indication of an area of expertise, and identifies persons that are estimated to be experts in that area. Another example of application 114 is an expertise search system which receives as an input an identification of an expert (such as a person's name) and identifies areas of expertise for the given expert. Outputting the relationships for the applications is indicated by block 154 in FIG. 2.

It can be seen from this overall discussion of FIG. 1 that object association mining can be characterized as a text mining problem. Specifically, given the co-occurrence data that identifies co-occurrences of words or topics between two sets of objects existing in different contexts, associative relationships can be discovered. It should also be noted, of course, that while the objects discussed herein for the sake of example are referred to as sets of terms (i.e., words or phrases) they can also be entities, properties, concepts, etc.

In any case, in order to identify associative relationships, it is first assumed that there are multiple sets of objects 104 and 106. Without loss of generality, assume that object sets 104-106 actually include three different objects: $X=\{x_1, x_2, \ldots, x_M\}$, $Y=\{y_1, y_2, \ldots, y_N\}$ and $Z=\{z_1, z_2, \ldots, z_R\}$. Next, it is assumed that there are multiple kinds of relationships between any pair of these sets of objects, which are X×Y, Y×Z, X×Z, X×X, Y×Y, and Z×Z. The term "X×X" refers to co-occurrence of objects within object set X; the term "X×Y" refers to a co-occurrence of a term in Xs and a term in Y, and so on. The relations between objects can be observed in multiple contexts. For instance, in one context, a topic might occur in the title while a person's name appears as the author. In another context, both the topic and the name appear in the body of a document. Each context is a subset of the co-occurrence data S, that is:

$$S = S_{XY,1} \cup S_{XY,2} \cup \ldots \cup S_{XX,1} \cup \ldots, \quad \text{Eq. 1}$$

where $S_{XY,1}=\{(x_1, y_1): x_1 \in X, y_1 \in Y, l=1, 2, \ldots \}$, $S_{XY,2}=\{(x_1, y_1): x_1 \in X, y_1 \in Y, l=1, 2, \ldots \}$, and $S_{XX,1}=\{(x_1, x_1'): x_1 \in X, x_1' \in X, l=1, 2, \ldots \}$.

The output of mining relationships between X and Y (for example) is defined as an estimation of the joint probability P(x, y), x∈X, y∈Y.

In the past, only a single type of co-occurrence was considered, such as the co-occurrence of an object in X with an object in Y in a predetermined context. It will be noted, however, that other kinds of relations over the two sets (such as relations within the set of objects X (X×X), or within the set of objects Y(Y×Y)) and the relationship between one of the two sets and other sets (such as between X and Z (X×Z) and between Y and Z (Y×Z)) can be used in discovering the targeted association (X,Y) as well. A model in accordance with one embodiment hereof considers these relations and combines these relations into a single model framework.

Also, in another embodiment, co-occurrence data in different contexts, can be considered. More specifically, suppose that the associative relation between two specific sets of objects x∈X and y∈Y is sought. It is clear that the co-occurrences in different contexts and other associative relationships can also be useful in finding the associative relation between X and Y. For example, suppose that there is another object x'∈X. If the relationship between x' and x and between x' and y is known, then that information will help in the understanding of the relation between x and y. Further, suppose there is another object z∈Z. If the relationships between z and x and between z and y are known, then that information can help in the understanding of the relationship between x and y as well.

As mentioned above, one current approach to identifying latent semantic associations between the two sets of objects is to use a separable mixture model (SMM). To understand the typed separable mixture model (TSMM) described herein, a brief, more formal, discussion of the SMM may be helpful. Suppose the two sets of objects are $X=\{x_1, x_2, \ldots, x_M\}$ and $Y=\{y_1, y_2, \ldots, y_N\}$. The latent association between the objects is represented by the following joint probability distribution which represents the SMM:

$$p(x, y) = \sum_{a=1}^{K} P(\alpha)P(x, y \mid \alpha) \quad \text{Eq. 2}$$
$$= \sum_{a=1}^{K} P(\alpha)P(x \mid \alpha)P(y \mid \alpha)$$

where random variables x and y denote objects, (x, y) ∈X×Y, and random variable a denotes a cluster $\alpha \in C$, $C=\{c_1, c_2, \ldots, c_K\}$. The clusters of objects represent the relations which are indicative of the latent associations between the sets of objects. Mining the latent associations then becomes the task of estimating the mixture model in Eq. 2. It should be noted that x and y are conditionally dependent given α, and thus are "separate".

Figure 3:
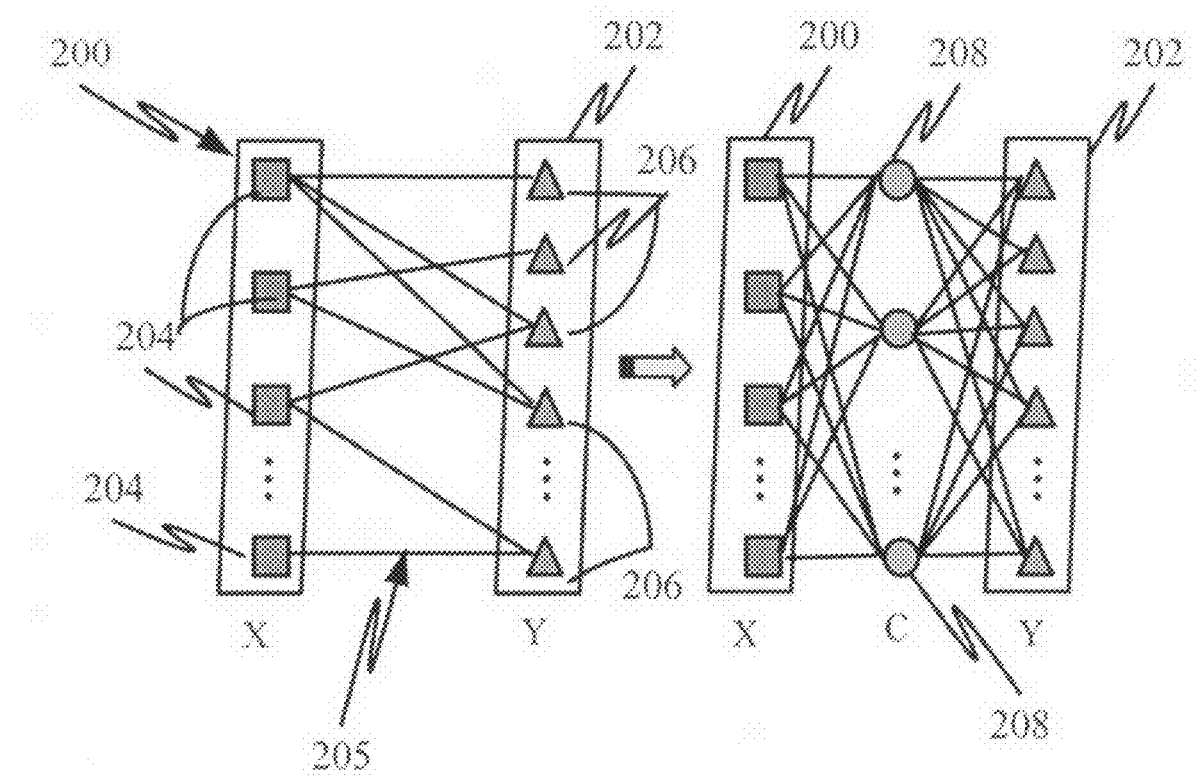
FIG. 3 illustrates relations in a separable mixture model.

FIG. 3 represents relationships between a first set of objects 200 (which corresponds to X) and a second set of objects 202 (which corresponds to Y). The squares 204 within set 200 represent the individual objects (such as people's names) in set 200. The diamonds 206 in set 202 represent the individual objects (such as topics) in set 202. The left side of FIG. 3 shows the relations (co-occurrence) between the individual objects in the sets 200, 204 which are identified by the solid lines 205 connecting them. The right side of FIG. 3 shows the objects X (200) and Y (202) and a set of clusters 208 of objects from the sets which are generated by estimating the mixture model shown in Eq. 2.

Assume that a sample of object pairs $S=\{(x_1, y_1): x_1 \in X, y_1 \in Y, l=1, 2, \ldots, L\}$ is given and is generated from the mixture model. The sample of object pairs S is simply the co-occurrence data set which identifies co-occurrences of objects within the two sets of objects in some set of textual data (such as corpus 107). The known estimation maximization (EM) algorithm can be employed to estimate the parameters of the SMM shown in Eq. 2 by maximizing the log likelihood (LL) of the model parameters θ=(P(α), P(x|α), P(y|α)) with respect to the sample data as follows:

$$LL = \sum_{i=1}^{M} \sum_{j=1}^{N} f(x_i, y_j) \log\left(\sum_{\alpha=1}^{K} P(\alpha)P(x_i \mid \alpha)P(y_j \mid \alpha)\right) \quad \text{Eq. 4}$$

where $f(x_i, y_j)$ denotes the frequency of object pair $(x_i, y_j)$.

Thus far, it can be seen that the SMM only considers using co-occurrence data between objects in X and Y, in a predetermined context. However, as discussed above, many other types of co-occurrences also exist and can be useful. In order to consider such co-occurrences, a type variable is introduced into the model to identify the type of co-occurrence being examined. The new model is thus referred to as a typed separable mixture model (TSMM), and will now be described in more detail.

Again, let $X=\{x_1, x_2, \ldots, x_M\}$, and $Y=\{y_1, y_2, \ldots, y_N\}$ represent two sets of objects. To model the co-occurrence relationships of X and Y in different forms, a type factor t is introduced. Letting (a, b, t) denote the co-occurrence of objects in a and b and having a type t. Then various kinds of co-occurrence data can be reformulated as $S'=\{(a_1, b_1, t_1): a_1 \in X \cup Y, b_1 \in X \cup Y, a_1 \neq b_1, t_1 \in T, l=1, 2, \ldots, L\}$ where T denotes the set of possible co-occurrence types. The co-occurrence data set is simply a sample of triples (a, b, t) generated from a probability distribution. The following generative model (the TSMM) has given rise to the sample data:

$$p(a, b, t) = \sum_{\alpha=1}^{K} P(t)P(a, b, \alpha \mid t) \quad \text{Eq. 5}$$

The log-likelihood of the model with respect to the data can be calculated as:

$$LL = \sum_{l=1}^{L} \log(P(a_l, b_l, t_l)) \quad \text{Eq. 6}$$

It can be seen that, compared to the conventional SMM shown in Eqs. 3 and 4, the additional type variable in the TSMM has been added. The TSMM is thus much more powerful and general than SMM, and this will be discussed below with respect to FIGS. 4-6.

Figure 4:
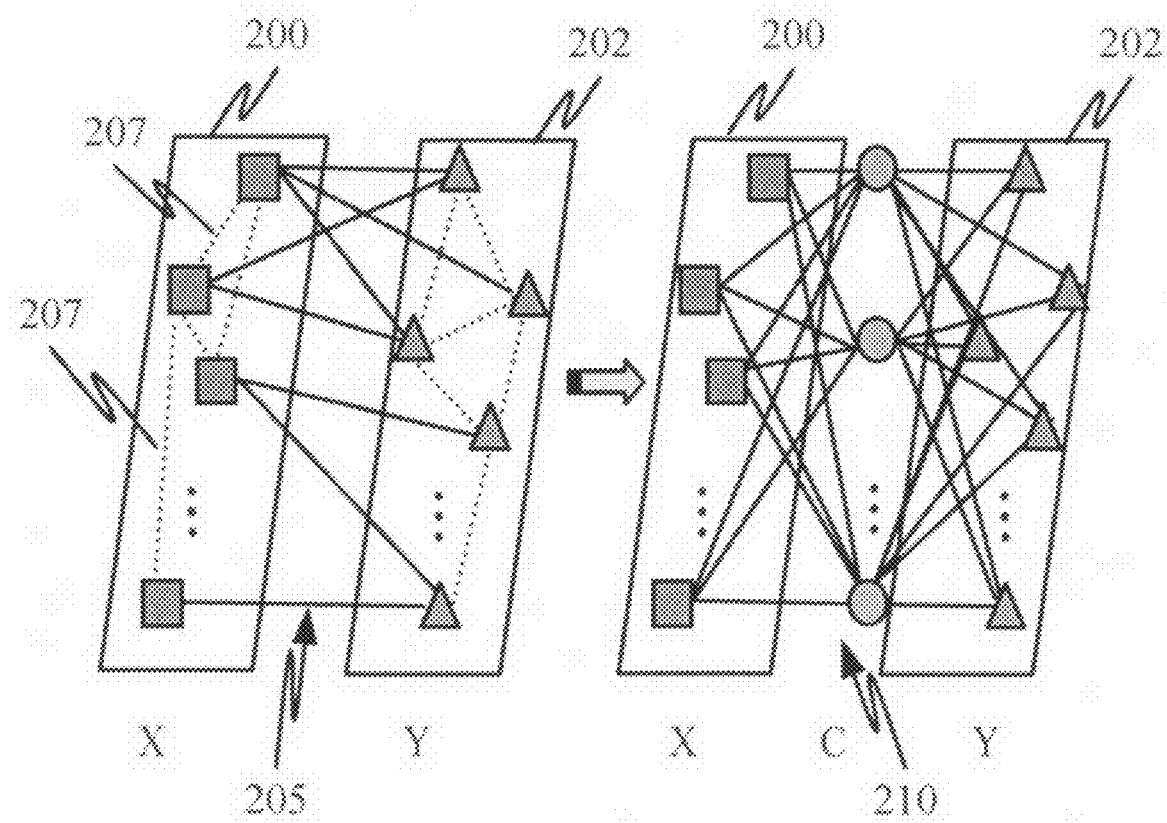
FIG. 4 illustrates multiple different types of co-occurrences that can be modeled using a typed separable mixture model (TSMM).

Because the type of co-occurrence is now identifiable, multiple different types of co-occurrences can be accounted for by the model. FIG. 4 shows sets of objects 200 and 202 (X and Y). The typed model (set out in Eqs. 5 and 6 above) can be used to consider co-occurrences between the objects in X with those in Y, as well as co-occurrences between the objects within X and co-occurrences between the objects within Y in order to help in mining associative relationships between X and Y. The solid lines 205 in FIG. 4 represent the co-occurrences between objects across sets 200 and 202 (X×Y). The dashed lines 207 represent the co-occurrences between objects within a set (X×X and Y×Y). Identifying associative relationships based on these different types of co-occurrences is indicated by block 160 in FIG. 2. The sample data is represented as follows:

$$S' = \{(a_l, b_l, t_l): a_l \in X \cup Y, b_l \in x \cup Y, t_l \in T, l=1, 2, \ldots, L\} \quad \text{Eq. 7}$$

where $T=\{t_{XY}, t_{XX}, t_{YY}\}$, and $t_{XY}, t_{XX}$, and $t_{YY}$ represent the type of the co-occurrences that occur across X and Y within X and within Y, respectively.

The joint probability of the triple (a,b,t) can be written as follows:

$$P(a, b, t) = \sum_{\alpha=1}^{K} P(t)P(\alpha \mid t)P(a, b \mid \alpha, t) \quad \text{Eq. 8}$$

$$= \sum_{\alpha=1}^{K} P(t)P(\alpha \mid t)P(a \mid \alpha, t)P(b \mid \alpha, t)$$

$$= \begin{cases} \sum_{\alpha=1}^{K} P(t_{XY})P(\alpha)P(x \mid \alpha)P(y \mid \alpha), & t = t_{XY} \\ \sum_{\alpha=1}^{K} P(t_{XX})P(\alpha)P(x \mid \alpha)P(x' \mid \alpha), & t = t_{XX} \\ \sum_{\alpha=1}^{K} P(t_{YY})P(\alpha)P(y \mid \alpha)P(y' \mid \alpha), & t = t_{YY} \end{cases}$$

where it is assumed that α is independent of t and that x (or y) is independent of t, given α. This is because α is an abstract cluster over two sets of objects not related to the type of the co-occurrence data. It should also be noted that through the use of α, co-occurrence data in different types t are linked together within the framework of the model set out in Eq. 8. Clusters 210 (indicative of the associative relationships) are generated by the TSMM described in Eq. 8.

The log-likelihood with respect to the given data S' becomes:

$$LL = \sum_{l=1}^{L} \log(P(a_l, b_l, t_l)) \quad \text{Eq. 9}$$

$$\sum_{i=1}^{M} \sum_{j=1}^{N} f(x_i, y_j, t_{XY}) \log$$

$$\left(\sum_{\alpha=1}^{K} P(t_{XY})P(\alpha)P(x_i \mid \alpha)P(y_j \mid \alpha)\right) +$$

$$\sum_{i=1}^{M} \sum_{j=1}^{M} f(x_i, x_j, t_{XX}) \log$$

$$\left(\sum_{\alpha=1}^{K} P(t_{XX})P(\alpha)P(x_i \mid \alpha)P(x_j \mid \alpha)\right) +$$

$$\sum_{i=1}^{N} \sum_{j=1}^{N} f(y_i, y_j, t_{YY}) \log$$

$$\left(\sum_{\alpha=1}^{K} P(t_{YY})P(\alpha)P(y_i \mid \alpha)P(y_j \mid \alpha)\right)$$

Eqs. 8 and 9 illustrate that by using the TSMM, all the co-occurrences between the objects are put together into the model framework and thus using the model to mine associative relationships is more accurate. More precisely, $a_i$ and $b_j$ become $x_i$ and $y_j$, $x_i$ and $x_j$, or $y_i$ and $y_j$, when type t changes.

The EM algorithm can be used for estimating the parameters $\theta = (P(t), P(\alpha), P(x|\alpha), P(y|\alpha))$ in the TSMM model and it can be derived as follows for the E-Step:

$$P^{(t+1)}(\alpha \mid (a, b, t)) = \frac{P^{(t)}(\alpha)P^{(t)}(a \mid \alpha, t)P^{(t)}(b \mid \alpha, t)P^{(t)}(t)}{\sum_{v=1}^{K} P^{(t)}(v)P^{(t)}(a \mid v, t)P^{(t)}(b \mid v, t)P^{(t)}(t)} \quad \text{Eq. 10}$$

where $p^{(t)}(a|\alpha, t)$ can be calculated from $\theta^{(t)}$ using Equation (7) and $p^{(t)}(b|\alpha, t)$ can be calculated similarly, as follows:

$$P^{(t)}(a \mid \alpha, t) = \begin{cases} P^{(t)}(x \mid \alpha), t \in \{t_{XX}, t_{XY}\}, x \in X \\ P^{(t)}(y \mid \alpha), t \in \{t_{YY}\}, y \in Y \end{cases} \quad \text{Eq. 11}$$

For the M-step:

$$P^{(t)}(t) = \frac{1}{\sum_{t' \in T} \sum_a \sum_b f(a, b, t')} \sum_a \sum_b f(a, b, t) \quad \text{Eq. 12}$$

$$P^{(t)}(\alpha) = \frac{1}{\sum_t \sum_a \sum_b f(a, b, t)} \sum_t \sum_a \sum_b f(a, b, t) P^{(t)}(\alpha \mid (a, b, t)) \quad \text{Eq. 13}$$

$$P^{(t)}(x \mid \alpha) = \frac{1}{\sum_t \sum_a \sum_b (f(a, b, t_{XY}) + 2f(a, b, t_{XX})) P^{(t)}(\alpha) \cdot} \left( \sum_{x' \in X} \binom{f(x, x', t_{XX})P^{(t)}(\alpha \mid (x, x', t_{XX})) +}{f(x', x, t_{XX})P^{(t)}(\alpha \mid (x', x, t_{XX}))} + \sum_{y \in Y} f(x, y, t_{XY}) P^{(t)}(\alpha \mid (x, y, t_{XY})) \right) \quad \text{Eq. 14}$$

$$P^{(t)}(y \mid \alpha) = \frac{1}{\sum_t \sum_a \sum_b (f(a, b, t_{XY}) + 2f(a, b, t_{YY})) P^{(t)}(\alpha) \cdot} \left( \sum_{y' \in Y} \binom{f(y, y', t_{YY})P^{(t)}(\alpha \mid (y, y', t_{YY})) +}{f(y', y, t_{YY})P^{(t)}(\alpha \mid (y', y, t_{YY}))} + \sum_{x \in X} f(x, y, t_{XY}) P^{(t)}(\alpha \mid (x, y, t_{XY})) \right) \quad \text{Eq. 15}$$

Figure 5:
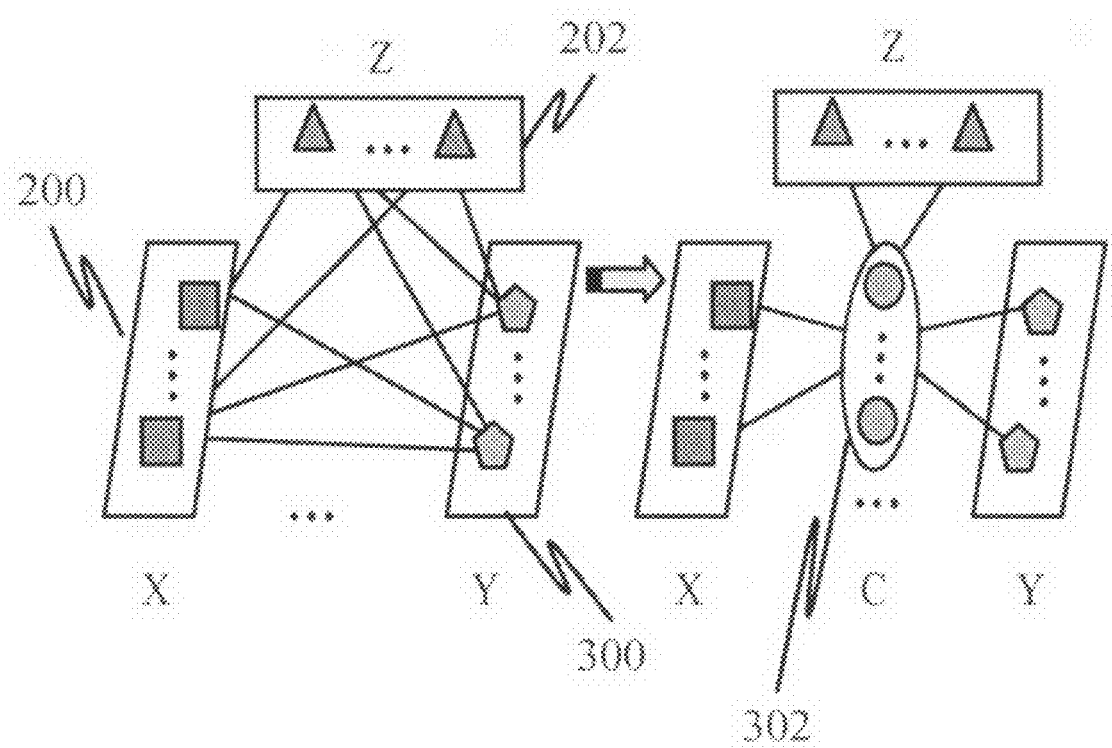
FIG. 5 illustrates co-occurrences among multiple sets of objects that can be modeled by a TSMM.
Figure 6:
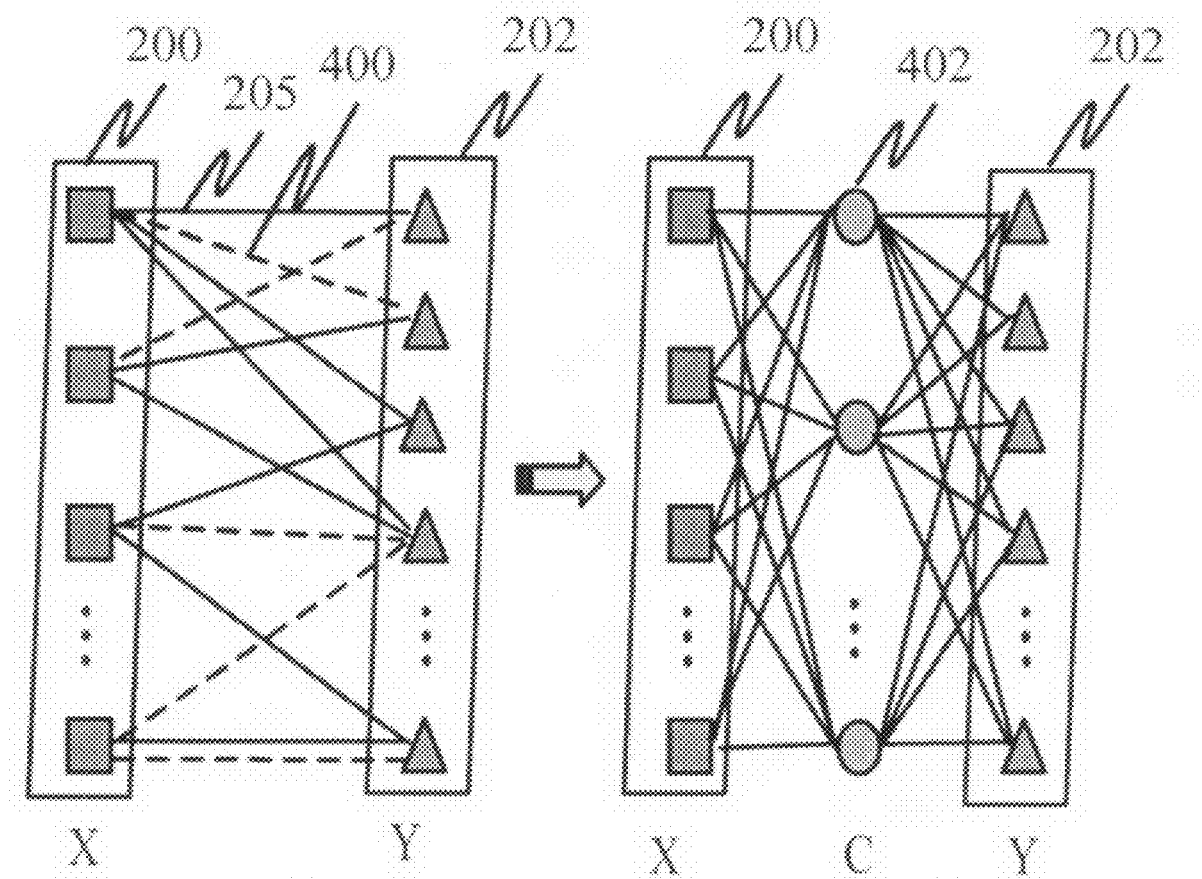
FIG. 6 illustrates co-occurrences among objects that occur in multiple different contexts, that can be modeled by a TSMM.

The TSMM can be extended to consider more than two sets of objects, as well. This is indicated by block 162 in FIG. 2. For example, Let $X=\{x_1, x_2, \ldots, x_M\}$, $Y=\{y_1, y_2, \ldots, y_N\}$, and also let a new set of objects $Z=\{z_1, z_2, \ldots, z_R\}$. FIG. 5 illustrates the co-occurrences among the three sets. Set X is represented by the numeral 200, set Y is represented by the numeral 202, as in the previous figures, and set Z is represented by the numeral 300. When the model is applied, clusters 302 are identified which represent the associative relationships among the three sets of objects, 200, 202, and 300 based on the co-occurrences identified.

To apply the model, again assume a triple (a,b,t) denotes an instance of co-occurrence of type t. The sample data is $S'=\{(a_1, b_1, t_1): a_1, b_1 \in X \cup Y \cup Z, t_1 \in T, l=1, 2, \ldots, L\}$, where $T=\{t_{XY}, t_{XZ}, t_{YZ}\}$ and $t_{XY}$, $t_{XZ}$, and $t_{YZ}$ represent the co-occurrences of objects between sets $X \times Y$, $X \times Z$, and $Y \times Z$ respectively. The log-likelihood for the joint probability of (a,b,t) can be calculated as follows:

$$LL = \sum_{l=1}^{L} \log(P(a_l, b_l, t_l)) \quad \text{Eq. 16}$$

$$= \sum_{i=1}^{M} \sum_{j=1}^{N} f(x_i, y_j, t_{XY}) \log \left( \sum_{\alpha=1}^{K} P(t_{XY}) P(\alpha) P(x_i \mid \alpha) P(y_j \mid \alpha) \right) +$$

$$\sum_{i=1}^{M} \sum_{j=1}^{R} f(x_i, z_j, t_{XZ}) \log \left( \sum_{\alpha=1}^{K} P(t_{XZ}) P(\alpha) P(x_i \mid \alpha) P(z_j \mid \alpha) \right) +$$

$$\sum_{i=1}^{N} \sum_{j=1}^{R} f(y_i, z_j, t_{YZ}) \log \left( \sum_{\alpha=1}^{K} P(t_{YZ}) P(\alpha) P(y_i \mid \alpha) P(z_j \mid \alpha) \right)$$

Of course, the EM algorithm can also be employed to estimate the parameters for the log-likelihood calculation.

It will further be noted that the TSMM can be extended to also consider co-occurrences that happen in different contexts. This is indicated by block 164 in FIG. 2. For example, in expert/expertise mining, co-occurrences between people and topics can be observed in not only the bodies of the documents, but also in the titles and author fields of the documents, for instance. Co-occurrences in these different contexts can be combined together within the framework of the TSMM. For the sake of example, the multiple contexts will be described assuming that there are only two sets of co-occurrence data, each set being from a single context. This is illustrated better with respect to FIG. 6.

FIG. 6 again shows two sets of objects 200 and 202 (X and Y). The solid lines 205 again indicate co-occurrences between objects in sets 200 and 202 (in X and Y), in a first context (such as within the bodies of the documents) while the dashed lines 400 illustrate co-occurrences of objects between the two sets of objects 200 and 202 (X and Y) in a second context (such as in the title and author fields of the documents). These two different types of co-occurrences (having a different context) are represented in the TSMM as follows: $t \in \{t_{XY}, t'_{XY}\}$, where $t_{XY}$ and $t'_{XY}$ denote two contexts. The model estimates the clusters 402 which represent the latent associative relationships between the objects in the two sets of objects, based on the co-occurrences in the various contexts discussed. In this way, the sample data can be represented as follows:

$$S' = \{(a_1, b_1, t_1): a_1 \in X, b_1 \in Y, t_1 \in T, l=1, 2, \ldots, L\}.$$

The log-likelihood for the joint probability of the triple (a,b,t) can be calculated as follows:

$$LL = \log(P(a_l, b_l, t_l)) \quad \text{Eq. 18}$$

$$= \sum_{i=1}^{M} \sum_{j=1}^{N} f(x_i, y_j, t_{XY}) \log \left( \sum_{\alpha=1}^{K} P(t_{XY}) P(\alpha) P(x_i \mid \alpha) P(y_j \mid \alpha) \right) +$$

-continued $$\sum_{i=1}^{M}\sum_{j=1}^{N}f(x_i, y_j, t'_{XY})\log\left(\sum_{\alpha=1}^{K}P(t'_{XY})P(\alpha)P(x_i\mid\alpha)P(y_j\mid\alpha)\right)$$

The EM algorithm can again be used to estimate the parameters for the log-likelihood shown in Eq. 18.

Figure 7:
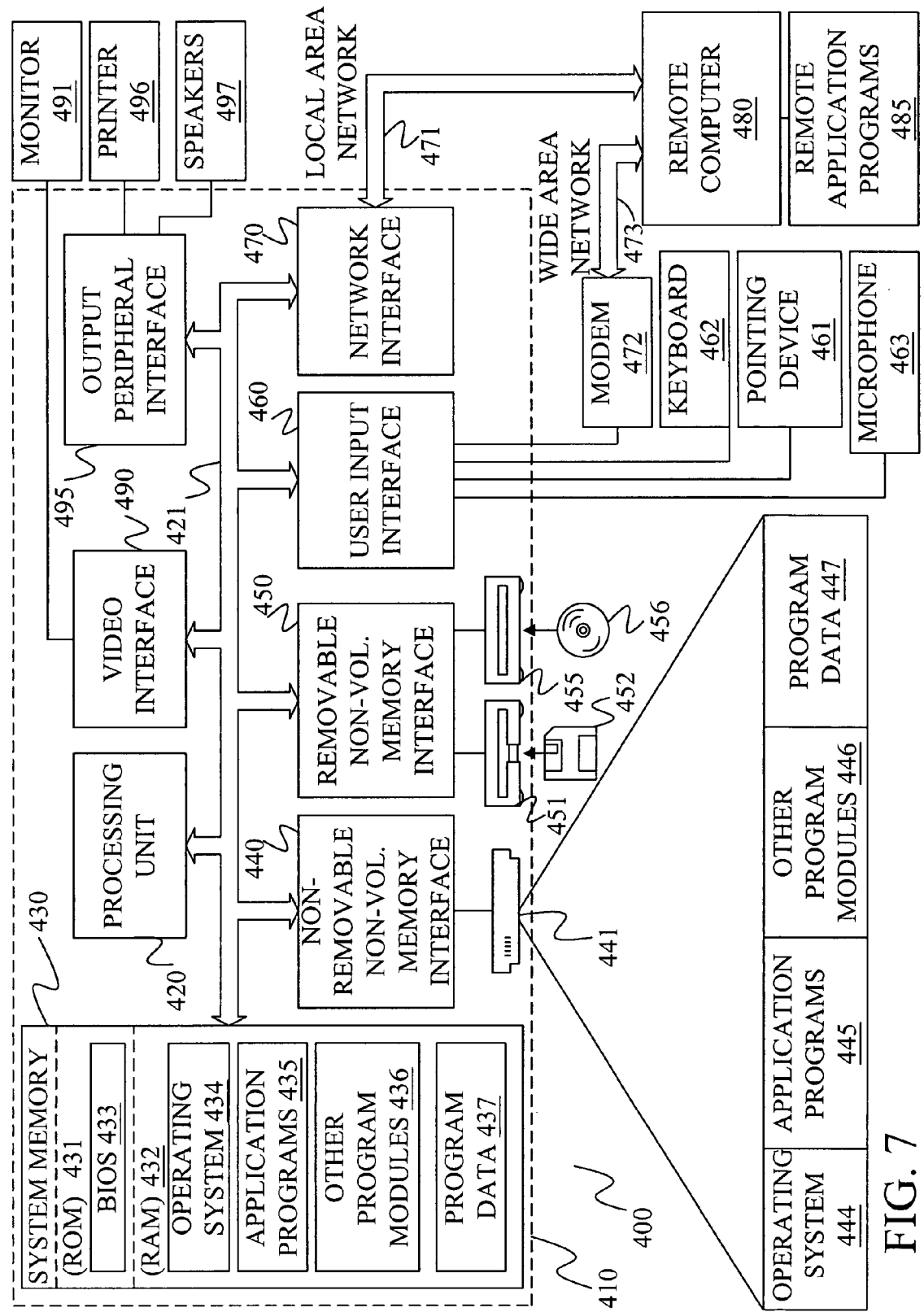
FIG. 7 is a block diagram of one illustrative computing environment in which the invention can be used.

FIG. 7 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 7 illustrates operating system 434, application programs 435, other program modules 436, and program data 437.

The computer 410 may also include other removable/non-removable volatile/nonvolatile computer storage media. By way of example only, FIG. 7 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 7, provide storage of computer readable instructions, data structures, program modules and other data for the computer 410. In FIG. 7, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. The system 100 and applications 114 can reside in program data 447 and application programs 445 or any other desired place.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 7 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 7 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An object association mining system, comprising:
    a mining component receiving a plurality of sets of objects and having access to a text corpus;
    a generative model identifying and storing associative relationships among objects in the sets of objects based on a plurality of different types of co-occurrences of the objects in the text corpus, the plurality of different types of co-occurrences including at least a first type, a second type, a third type, and a fourth type, the first type comprising co-occurrences of two objects from different sets of objects within the text corpus, the second type comprising co-occurrences of objects in at least three different sets of objects within the text corpus, the third type comprising co-occurrences of objects in different contexts within the text corpus and being a subset of the first type of co-occurrences, and the forth type comprising co-occurrences of objects within each set in the sets of objects within the text corpus, the generative model combining the at least four different types of co-occurrences to identify latent associations between the sets of objects that are not express in the text corpus wherein the generative model comprises a separable mixture model that estimates a probability of latent associations between first and second objects by estimating a probability of the first object and the second object co-occurring in a type of co-occurrence for a plurality of different types of co-occurrences with a type variable that identifies the type of co-occurrence; and
    a computer processor activated by the mining component and the generative model, to facilitate identifying and storing the associative relationships.

2. The object association mining system of claim 1 wherein the model estimates a joint probability of the plurality of different types of co-occurrences of the objects in the sets of objects.

3. The object association mining system of claim 1 and further comprising:
    a search application identifying an expert, given a topic, based on the associative relationships.

4. The object association mining system of claim 1 and further comprising:
    a search application identifying a topic of expertise, given a person's name, based on the associative relationships.

5. A system for identifying latent relationships among objects in a plurality of sets of objects, comprising:
    a single generative model comprising a separate mixture model having components that generate clusters indicative of latent associative relationships among the objects in at least two different sets of objects, each set including a plurality of related objects, by estimating probabilities of the latent associative relationships between first and second objects using a type variable to model the latent associate relationships derived from a combination of a plurality of different types of co-occurrences of the objects in a text corpus, the model outputting the clusters for use by a search system, the model estimating the probabilities of the latent associative relationships by estimating a probability of the first object and the second object co-occurring in a type of co-occurrence for the plurality of different types of co-occurrences with the type variable identifying the type of co-occurrence; and
    a computer processor, activated by the model, to facilitate generation of clusters and outputting the clusters.

6. The system of claim 5 wherein the components generate the clusters by estimating a probability of a co-occurrence, within the text corpus, of objects within a set of objects.

7. The system of claim 6 wherein the components generate the clusters by estimating a probability of a co-occurrence, within the text corpus, of objects in more than two sets of objects.

8. The object association mining system of claim 7 wherein the components generate the clusters by estimating a probability of a co-occurrence, within the text corpus, of objects in different contexts within the text corpus.

9. The object association mining system of claim 5 wherein the search system comprises an expert search system.

10. The object association mining system of claim 5 wherein the search system comprises an expertise search system.

11. The object association mining system of claim 5 wherein the components are arranged to form a typed separable mixture model.

12. A computer-implemented method of identifying data relevant to a search using a computer with a processor, comprising:

receiving a plurality of sets of objects;

accessing a text corpus;

identifying, with the processor, co-occurrences of objects in the plurality of sets, each of the co-occurrences being one of a plurality of different types of co-occurrences within the text corpus;

generating, with the processor, an output indicative of associative relationships among the objects based on the different types of co-occurrences identified, using a single generative model, wherein the single generative model comprises a separable mixture model that estimates a probability of latent associations between first and second objects by estimating a probability of the first object and the second object co-occurring in a type of co-occurrence for the plurality of different types of co-occurrences with a type variable that identifies the type of co-occurrence; and identifying, with the processor, the data relevant to the search based on the output indicative of the associative relationships.

13. The method of claim 12 wherein generating the output comprises:

generating clusters of the objects indicative of the associative relationships.

14. The method of claim 13 wherein generating the clusters comprises:

generating the clusters of objects based on co-occurrences of the objects within a set of objects.

15. The method of claim 13 wherein generating the clusters comprises:

generating the clusters of objects based on co-occurrences of the objects in different contexts in a text corpus.

16. The method of claim 13 wherein generating the clusters comprises:

generating the clusters based on co-occurrences of objects in more than two sets of objects.

\* \* \* \* \*